March 26, 1968  E. M. TRAMMELL, JR  3,374,568
LICENSE PLATE HOLDER

Filed June 30, 1965  2 Sheets-Sheet 1

INVENTOR.
EARL M. TRAMMELL JR.
BY Cohn and Powell

ATTORNEY.

March 26, 1968  E. M. TRAMMELL, JR  3,374,568
LICENSE PLATE HOLDER

Filed June 30, 1965  2 Sheets-Sheet 2

INVENTOR.
EARL M. TRAMMELL JR.
BY Cohn and Powell
ATTORNEY.

United States Patent Office 3,374,568
Patented Mar. 26, 1968

3,374,568
LICENSE PLATE HOLDER
Earl M. Trammell, Jr., Ladue, Mo.
(P.O. Box 435, St. Louis, Mo. 63166)
Continuation-in-part of application Ser No. 422,648,
Dec. 31, 1965. This application June 30, 1965, Ser.
No. 468,422
16 Claims. (Cl. 40—209)

ABSTRACT OF THE DISCLOSURE

The license plate holder includes a frame for holding a license plate, the frame having a hook at one side and a snap fastener at the opposite side. The hook interfits one of a pair of spaced holes in the bumper and by swinging the frame about the hook connection in one of the spaced holes, the snap fastener may be connected to the other spaced hole. The fasteners include a flange which extends behind the frame, and a resilient pad is secured to each flange. The pad engages the license plate, and thereby accommodates vibration.

This application is a continuation-in-part of co-pending application Ser. No. 422,648, filed Dec. 31, 1964 by this applicant.

This invention relates generally to improvements in a license plate holder, and more particularly to an improved means for mounting such holder to a vehicle bumper or other holder-supporting plate.

An important object is to achieve a license plate holder that can be sold to and used by the automobile owner, and which can be easily installed by the owner with the use of a single screw, and which can be readily used by the automobile dealer for installation of dealer plates.

Another important object is realized by the construction of the license plate holder in which a frame carries a hook at one side and in which a fastening means is attachable to another side of the frame, the hook interfitting and engaging a coacting abutment on the holder-supporting plate to fix selectively one side of the frame.

Still another important objective is afforded by the provision of a snap fastener attachable to the other side of the frame to secure that side of the frame selectively to the holder-supporting plate, the snap fastener snapping into a coacting hole and extending behind the hole margin to preclude unintentional withdrawal.

An important object is attained by the structural arrangement in which the hook carried by the side of the frame interfits a compatible hole in the support plate, while the snap fastener attachable to the opposite side of the frame is selectively connectible in a compatible hole in the support plate by first connecting the hook in its associated hole and then swinging the frame about the hook connection toward the support plate in order to obtain suitable connection of the snap fastener.

Another important objective is provided by a flange on the fastening means carried by the frame, the flange extending behind the frame and overlapping the license plate, and by a resilient pad secured to the flange and engageable with the license plate to retain the plate within the frame. When the license plate holder is installed, the resilient pad is compressed between the support plate and license plate to press the license plate into and against the frame to form a tight fit that precludes any rattle.

Yet another important object is achieved by the mounting of the resilient pad on the flange of the snap fastener so as to provide a completely assembled part that can be either snapped separately into the coacting support plate hole or attached to and carried by the frame for snapping engagement into such plate hole.

An important objective is realized by the provision of an expansible wedge on the snap fastener that engages behind the support plate to preclude unintentional removal. A screw is utilized by the vehicle owner to secure the frame to the snap fastener, the screw precluding retraction of the wedge when installed, and thereby providing a tight, solid attachment of the frame to the support plate which cannot be disturbed without removal of the screw.

Another important objective is afforded by the provision of a cam shoulder on one embodiment of the snap fastener which engages the support plate to secure the frame to the support plate so as to prevent accidental removal, yet engages to retract the expansible wedge from behind the support plate for intentional disconnection as the frame is forcefully pried away from the support plate. This type of holder and the resulting attachment is especially suitable for vehicle dealers in quickly and easily attaching or detaching dealer license plates.

It is an important object to provide a license plate holder and mounting therefor that is simple and durable in construction, economical to manufacture and assemble, highly efficient in operation, and which can be readily utilized by anyone with little or no instruction.

The foregoing and numerous other objects and advantages of the invention will more clearly appear from the following detailed description of several embodiments, particularly when considered in connection with the accompanying drawings, in which.

Figure 1:
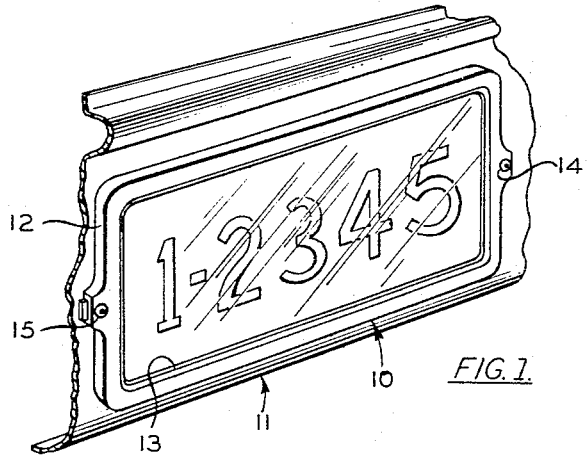
FIG. 1 is a perspective view illustrating the assembly and mounting of the license plate holder to an automobile bumper.

Referring now by characters of reference to the drawings, and first to FIGS. 1, it is seen that the license plate holder generally indicated at 10 is mounted to an automobile bumper referred to at 11 and constituting a holder-supporting means. The holder 10 includes a substantially rectangular frame 12 providing a window 13. Fastening means 14 and 15 secure opposite sides of the frame 12 to the automobile bumper 11.

Figure 2:
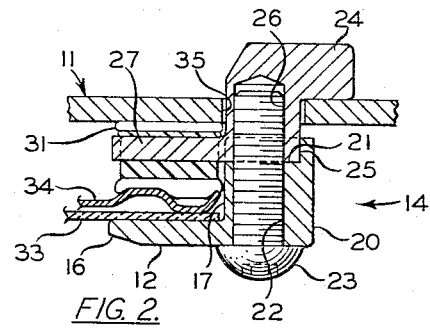
FIG. 2 is a fragmentary, enlarged cross sectional view of the mounting at the right side of FIG. 1.
Figure 5:
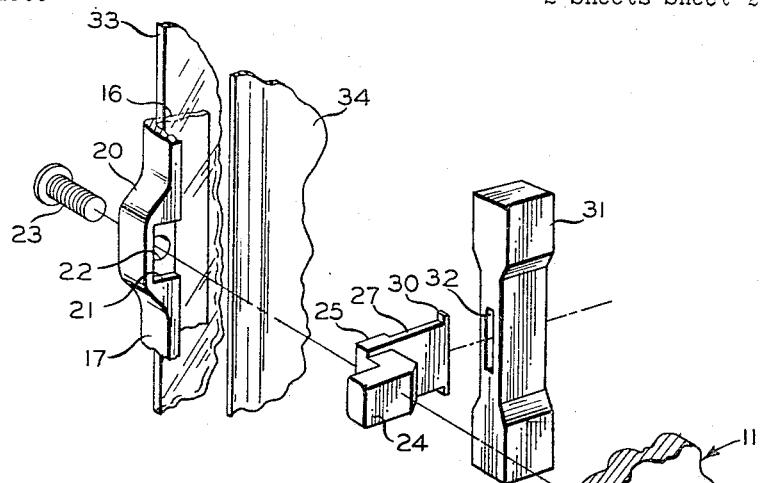
FIG. 5 is an exploded perspective view of the mounting shown in FIG. 2 as seen from the rear.

The fastening means 14 utilized at one side of the frame 12 is best shown in FIGS. 2 and 5. The license plate frame 12 is constructed of an angle having a front flange 16 and a side flange 17. A boss 20 is formed integrally on the side flange 17 and projects laterally outward. The rear side of the boss 20 is provided with a substantially square recess 21. Formed through the boss 20 from the front of the frame to the recess 21 is a bore 22 adapted to receive a screw 23.

A hook 24 is attached to and carried by the frame 12. Specifically, the hook 24 includes a base 25 interfitting the recess 21. The hook 24 is secured to the boss 20 by the screw 23 threadedly engaging a tapped hole 26 formed in the hook base 25. If desired, the hook 24 can be permanently secured to the frame 12 by molding the hook 24 integrally with the frame or by attaching the hook 24 with a tap-drive screw extending through the boss bore 22 and into the hook hole 26.

The hook 24 includes a flange 27 extending inwardly behind the frame 12 from the hook base 25, the flange 27 being provided with a pair of tips 30 extending laterally outward from opposite sides of such flange 27. An elongate resilient pad 31 constructed of a material such as rubber is provided with a narrow slot 32 therethrough adapted to receive the base flange 27 of hook 24. When the rubber pad 31 is mounted on the base flange 27, the lateral tips 30 engage the side of pad 31 to retain such pad 31 in assembly. The resiliency of the pad 31 and the size of the slot 32 enable the pad 31 to grip the base flange 27 tightly when assembled.

A transparent panel 33 and the license plate 34 are slipped into the frame 12 between the front frame flange 16 and the rubber pad 31. The rubber pad 31 is resiliently compressed to hold the license plate 34 and window 33 in place within the frame 12.

When this side of the frame 12 is secured to the bumper 11, the hook 24 is inserted into a compatible, substantially square bumper hole 35, the hook 24 engaging behind the bumper 11 to fix the frame 12. The resilient pad 31 is compressed between the bumper 11 and the license plate 34 to press the license plate 34 tightly within its frame 12 to preclude any rattle.

Figure 3:
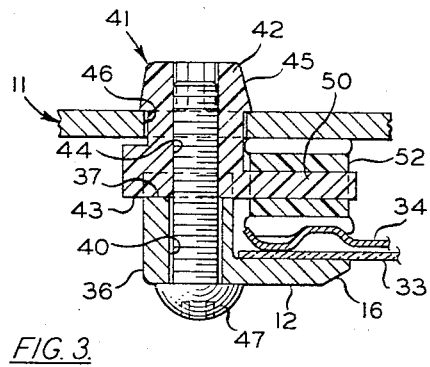
FIG. 3 is a fragmentary, enlarged cross sectional view of the mounting at the left side of FIG. 1.
Figure 6:
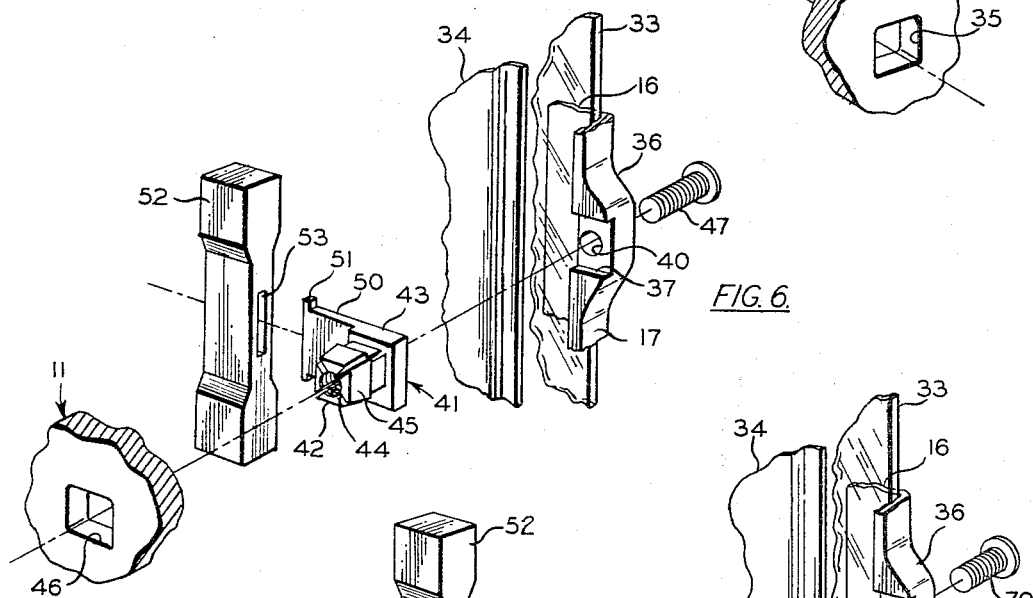
FIG. 6 is an exploded perspective view of the mounting shown in FIG. 3 as seen from the rear.

The fastening means for securing the opposite side of the frame 12 to the bumper 11 is best shown in FIGS. 3 and 6. This embodiment of the fastening means is utilized by the automobile owner to affix his license plate within the frame and to secure such frame to the bumper 11.

This opposite side of the frame 12 is provided with a laterally extending boss 36, the rear of which is provided with a substantially square recess 37. A bore 40 is formed through the boss 36, the bore 40 extending from the front of the frame 12 through the rear recess 37.

A snap fastener generally indicated at 41 is preferably constructed of a molded plastic and includes a plurality of expansible wedges 42 integrally connected by a base 43 adapted to seat within the rear recess 37. The expansible wedges 42 surround a threaded bore 44 formed therethrough and alignable with the boss bore 40. The wedges 42 include tapered outer faces 45 engageable with the margin of a substantially square hole 46 formed in the bumper 11 upon insertion of the wedges 42 into such hole 46, whereby to retract the wedges incident to insertion. Upon complete insertion, the wedges 42 snap behind the bumper 11 to preclude unintentional withdrawal from the hole 46.

A screw 47 is inserted through the boss bore 40 and threadedly connected to the snap fastener 41 in the threaded bore 44, the screw 47 securing the frame 12 to the snap fastener 41 and consequently securing the frame 12 to the bumper 11. It will be noted that the screw 47 when located in the snap fastener bore 44 holds the wedges 42 in their expanded position behind the bumper 11, thereby preventing the wedges 42 from retracting and thereby preventing withdrawal from the bumper hole 46 until the screw 47 is removed. It will be understood that the margins of the spaced holes 35 and 46 constitute a locking means cooperating with the fastening means on opposite sides of the frame 12 to attach the frame 12 to the bumper 11.

The base 43 of the snap fastener 41 includes a flange 50 extending inwardly behind the frame 12. A pair of laterally extending tips 51 are formed on the outermost end of flange 50.

An elongate, resilient pad 52 formed of rubber or like material, is provided with a narrow slot 53 adapted to receive the base flange 50. The resiliency of the rubber pad 52 and the dimension of the slot 53 causes the pad 52 to grip the flange 50 tightly when the pad 52 is mounted. The flange 50 extends through the slot 53 so that the tips 51 engage the pad 52 to hold the pad 52 in assembly with the snap fastener 41.

The resilient pad 52 engages the license plate 34 and urges the license plate 34 and the adjacent window panel 33 tightly against the front frame flange 16. When the license plate holder 10 is assembled with this fastening means of FIGS. 3 and 6, the resilient pad 52 is compressed between the license plate 34 and the bumper 11 to hold the license plate in tight engagement with the frame 12 to preclude rattle.

To assemble the snap fastener of FIGS. 3 and 6, the snap fastener 41 is pressed into and through the bumper hole 46 until the wedges 42 expand to lock behind the bumper 11. Then, the frame 12 is located over the snap fastener 41 with the fastener base 43 located within the recess 37 of the frame boss 36 and the boss bore 40 aligned with the fastener bore 44. It is assumed that the license plate 34 and the window panel 33 are located within the frame 12 adjacent the front flange 16. The screw 47 is then inserted into the boss bore 40 and threadedly attached to the fastener 41 in the threaded bore 44 between the wedges 42. The screw 47 is drawn up tight to secure the frame 12 to the snap fastener, and hence to the bumper 11. The pad 52 engages the license plate 34 and is compressed between the license plate 34 and bumper 11 in the manner previously described. The snap fastener 41 cannot be detached without first withdrawing the screw 47 because the screw 47 holds the wedges 42 in their expanded position behind the bumper 11.

Figure 4:
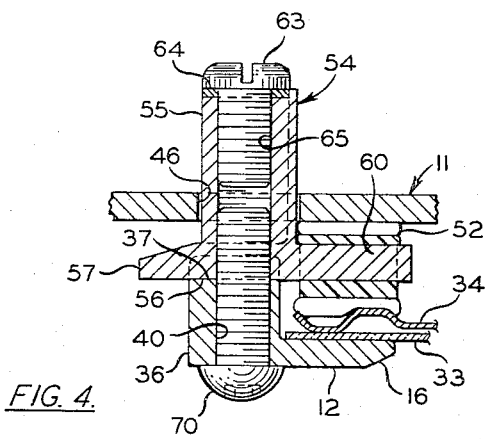
FIG. 4 is a fragmentary, enlarged cross sectional view of a modified embodiment of the mounting at the left side of FIG. 1.
Figure 7:
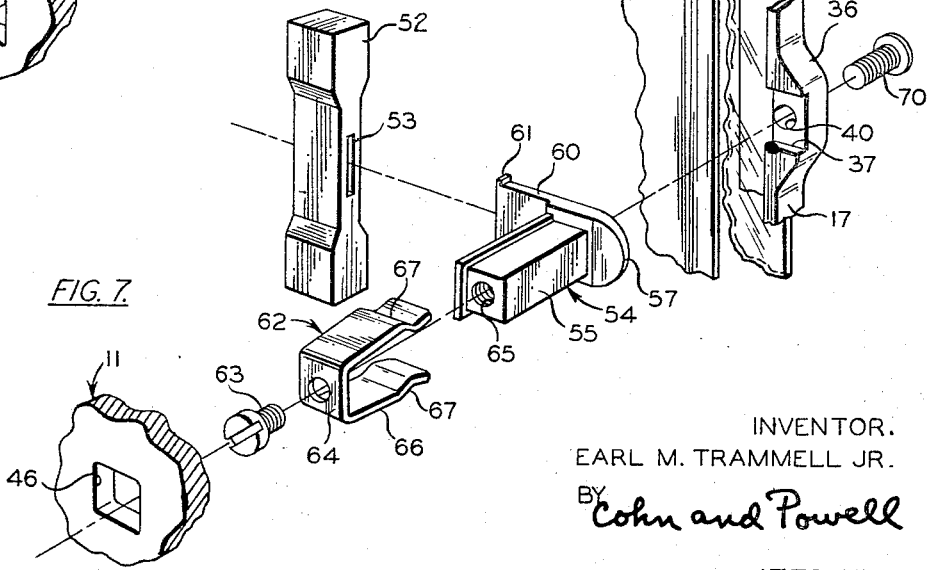
FIG. 7 is an exploded perspective view of the modified mounting shown in FIG. 4 as seen from the rear.

Another embodiment of the fastening means utilized in lieu of the fastening means disclosed in FIGS. 3 and 6, is disclosed in FIGS. 4 and 7. This fastening means of FIGS. 4 and 7 is especially adapted for convenient switching of dealer plates and can be used by automobile dealers in affixing the license plate frame 12 and the license plate 34 contained therein to the bumper 11.

For clarity, the corresponding parts of FIGS. 4 and 7 will be given the same reference numbers as FIGS. 3 and 6 wherever possible.

For example, the frame 12 includes a laterally projecting boss 36 with a substantially square recess 37 in the rear face. The boss 36 is provided with a bore 40 from the front through the recess 37. The snap fastener 54 includes a post 55 of substantially square cross section adapted to interfit the substantially square hole 46 formed in the bumper 11. The snap fastener 54 includes an integral base 56 seating in the recess 37. Formed integrally with the base 56 is a tab 57 extending laterally outward beyond the frame boss 36, the purpose and function of the tab 57 becoming clear upon later description of parts. Formed integrally with the base 56 is a flange 60 extending inwardly behind the front flange 16 and behind the license plate 34 positioned within the frame 12. The flange 60 is provided with a pair of laterally extending tips 61 at its end.

As is best seen in FIG. 7, a substantially U-shaped spring referred to by 62 is fixed to the outermost end of post 55 by a screw 63, the screw 63 extending through the spring web 64 and into the threaded bore 65 formed through the post 55 and the base 56. A press-fit pin or drive screw may be used in lieu of screw 63. The spring 62 includes a pair of expansible arms 66 retractable upon insertion into the bumper hole 46 and expansible upon complete insertion so that the cam shoulders 67 engage behind the bumper to retain the snap fastener 54 to the bumper 11. The cam shoulders 67 have sufficient slope and engagement with the bumper margin defining the hole 46 to preclude unintentional or accidental disengagement of the snap fastener 54 from the bumper 11. In other words, it takes a force of a definite and predetermined magnitude applied by a positive, forceful action to the snap fastener 54 in order for the cam shoulder 67 to retract the spring arms 66 to permit disconnection and withdrawal of the snap fastener 54 from the bumper 11.

To assemble the snap fastener 54 to the frame 12, the base 56 is seated in the rear recess 37, and a screw 70 is inserted into and through the bore 40, and into threaded engagement with the bore 65 formed in the fastener base 56. Tightening of the screw 70 secures the snap fastener 54 to the frame 12 so that such snap fastener is carried therewith.

Again, with this fastening means of FIGS. 4 and 7, an elongate, resilient pad 52 is carried by the snap fastener 54, the pad 52 being provided with a narrow slot 53 therethrough receiving the flange 60. When the pad 52 is mounted on the flange 60, the flange tips 61 engage the pad 52 and prevent accidental removal. The size and shape of the pad slot 53 allows the resilient pad 52 to grip tightly about the flange 60.

When the snap fastener 54, fixed to the frame 12, is inserted through the bumper hole 46, the spring arms 66 retract until the snap fastener 54 is fully inserted. Upon complete insertion, the spring arms 66 will snap outwardly and the cam shoulders 67 will engage behind the bumper 11 to secure the snap fastener 54 to the bumper 11, and hence secure the frame 12 to such bumper 11. The resilient pad 52 will be compressed between the bumper 11 and the license plate 34, thereby pressing the license plate 34 and the window panel 33 tightly against the front flange 16 of frame 12.

To disconnect the snap fastener 54 and the frame 12 from the bumper 11, a suitable tool, such as a screw driver, is inserted in the space between the fastener tab 57 and the bumper 11, and an outward pressure is applied to the tab 11 to pry the snap fastener forcefully out of the bumper hole 46. Upon application of the prying force, the cam shoulders 67 engaging the rear surface of the bumper 11 at the periphery of the bumper hole 46 will cause a retraction of the spring arms 66 to permit withdrawal of the fastener post 55 and the spring 62 from the bumper hole 46.

It is thought that the usage and functional advantages of the license plate holder have become fully apparent from the foregoing detailed description of parts, but for completeness of disclosure the usage of this license plate holder by both the automobile owner and the automobile dealer will be briefly described.

First, it will be assumed that an automobile owner is using this license plate frame 12 to fix his license plate 34 to the bumper 11 of his automobile. The owner first inserts the snap fastener 41 into one of the bumper holes 46, the flange 50 and the attached rubber pad 52 being disposed in the direction toward the other bumper hole 35. The owner then places the window panel 33 and the license plate 34 within the frame 12 and against the front flange 16, one side of the license plate 34 and the window 33 being located underneath the resilient pad 31 carried by the hook flange 27.

The frame 12 is angularly disposed to insert the hook 24 into the bumper hole 35, and the frame 12 is swung toward the bumper 11 so that the hook 24 engages behind the bumper 11 to fasten this side of the frame 12 securely. As the opposite side of the frame 12 is swung toward the bumper 11 about the hook connection, the frame boss 36 is brought over the snap fastener 41 to align the boss bore 40 with the fastener bore 44, and to seat the fastener base 43 in the rear recess 37. Then, the screw 47 is inserted in the boss bore 40 and is threadedly attached to the fastener 41 in the fastener bore 44, the screw 47 securing the frame 12 to the fastener 41.

As mentioned previously, the screw 47, when inserted and turned tight, extends between the expansible wedges 42 and prevents retraction from behind the bumper 11. The rubber pads 31 and 52 are compressed between the bumper 11 and the license plate 34 to press the license plate 34 and the window panel 33 tightly against the front flange 16 to reclude any rattle. It will be importantly noted that this license plate frame is installed by the use of a single screw by the automobile owner.

To detach the license plate frame 12, the automobile owner merely detaches the screw 47 to release the frame boss 36 from the snap fastener 41, and swings that side of the frame 12 outwardly a sufficient distance to detach the hook 24 from the bumper 11 and thereby allow withdrawal of the hook 24 from the bumper hole 35. The owner can then insert a new license plate 34 and/or a new window panel 33 and re-apply the license plate frame in the manner previously described.

An automobile dealer's business requires the dealer to take one dealer's license plate from one automobile and transfer it to another automobile. It is advantageous to the dealer that this transfer be accomplished quickly and easily. Therefore, the automobile dealer will utilize the hook fastening means of FIG. 2 on one side of the license plate frame and the fastening means 54 of FIGS. 4 and 7 at the opposite side of the license plate frame.

It will be assumed that the window panel 33 and the license plate 34 are inserted into the frame 12, one side being disposed between the rubber pad 31 of the hook flange 27 and the front flange 16 of frame 12 while the opposite side is located against the front flange 16, also. Then, the snap fastener 54 is seated in the recess 37 and fixed to the frame boss 36 by screw 70, the resilient pad 52 engaging the license plate 34 and holding that side of the license plate 34 and window panel 33 tightly against the front flange 16 of frame 12. It will be importantly noted that the snap fastener 54 is carried by the frame 12 and that the dealer's license plate 34 is retained within the frame 12.

To install this automobile dealer's license plate frame 12 having the constructions of FIGS. 2 and 4, the hook 24 is inserted into and through the bumper hole 35 to engage the hook 24 behind the bumper 11. The frame 12 is then swung about the hook connection toward the bumper to insert the fastener post 55 and spring 62 into and through the other bumper hole 46. As the fastener 54 is pressed into the bumper hole 46, the spring arms 66 retract, and upon complete insertion, the spring arms 66 subsequently expand to engage the cam shoulders 67 behind the bumper 11. The fastener 54 is now secured and the frame 12 is fixed to the bumper 11. As stated previously, the cam shoulders 67 engage the rear margin of bumper hole 46 under sufficient pressure so that the frame 12 cannot be accidentally or unintentionally pulled away from the bumper 11.

When installed, the rubber pads 31 and 52 are compressed between the bumper 11 and the license plate 34 to press the license plate 34 and the window panel 33 tightly against the front flange 16 of frame 12. In addition, this resilient action of pads 31 and 52 serves to provide a slight outward force on the frame 12 which creates and maintains tight engagement between the hook 24 and the bumper 11 and between the spring cam shoulders 67 and the bumper 11, and thereby prevents any rattle.

To disconnect the automobile dealer's license plate frame 12, a tool is placed into engagement with the underside of tab 57 and the fastener 54 is pried outwardly with sufficient force so that the cam shoulders 67 retract the spring arms 66 in order to withdraw the post 55 and srping 62 from the bumper hole 46. This side of the frame 12 is then swung outwardly to disengage the hook 24 from behind the bumper 11, and the hook 24 is then removed from the bumper hole 35.

The automobile dealer can then use this same frame 12 to apply the same license plate 34 to another automobile in the same manner.

It will be importantly noted that this frame 12 (FIGS. 2 and 4) can be applied and utilized by the automobile dealer without the use of any tools, as for example, merely by hooking on one side of the frame and snapping in the opposite side of the frame. Of course, some lever must preferably be used to pry the fastener 54 forcefully out of engagement with the bumper 11 upon disassembly.

Although the invention has been described by making detailed reference to several embodiments, such detail is to be understood in an instructive, rather than in any restrictive sense, many variants being possible within the scope of the claims hereunto appended.

I claim as my invention:

1. A license plate holder assembly comprising:
   (a) a holder-supporting plate provided with spaced locking means,
   (b) a frame for holding a license plate,
   (c) a hook carried by one side of the frame cooperates with the spaced locking means, and
   (d) a snap fastener carried by the opposite side of the frame and selectively connectible with the spaced locking means by first connecting the hook and then swinging the frame about the hook connection to connect the snap fastener.

2. In a license plate holder:
   (a) a frame for holding a license plate,
   (b) a fastening means carried by one side of the frame, the fastening means including a flange extending behind the frame and adapted to overlap the license plate, and
   (c) a resilient pad secured to the flange and engageable with the rear of the license plate.

3. In a license plate holder:
   (a) a frame for holding a license plate,
   (b) a fastening means carried by one side of the frame, the fastening means including a flange extending behind the frame and adapted to overlap the license plate, and
   (c) a resilient pad provided with a slot therethrough receiving the flange, the pad being engageable with the license plate.

4. In a license plate holder:
   (a) a frame for holding a license plate,
   (b) a fastening means carried by one side of the frame, the fastening means including a flange extending behind the frame and adapted to overlap the license plate, the flange being provided with laterally projecting tips, and
   (c) an elongate resilient pad provided with a slot receiving the flange,
   (d) the flange tips engaging the pad to retain the pad on the flange,
   (e) the pad being engageable with the license plate.

5. In a license plate holder:
   (a) a frame for holding a license plate,
   (b) a fastening means attachable to one side of the frame, the fastening means including an element adapted to connect to a holder-supporting means, and including a flange extending inwardly behind the frame to overlap the license plate, and
   (c) a resilient pad secured to the flange and engageable with the license plate to hold the plate in the frame.

6. In a license plate holder:
   (a) a frame for holding a license plate,
   (b) a hook attachable to one side of the frame adapted to connect to a holder-supporting means, the hook including a flange extending inwardly behind the frame to overlap the license plate, and
   (c) a resilient pad secured to the flange and engageable with the license plate to hold the plate in the frame.

7. In a license plate holder:
   (a) a frame for holding a license plate,
   (b) a snap fastener attachable to one side of the frame and adapted to connect to a holder-supporting means, the snap fastener including a flange extending inwardly behind the frame to overlap the license plate, and
   (c) a resilient pad secured to the flange and engageable with the license plate to hold the plate in the frame.

8. In a license plate holder:
   (a) a frame for holding a license plate,
   (b) a fastening means attachable to one side of the frame, the fastening means including an expansible wedge adapted to engage behind a holder-supporting means to preclude removal, and including a flange extending inwardly behind the frame to overlap the license plate, and
   (c) a resilient pad secured to the flange and engageable with the license plate to hold the plate in the frame.

9. In a license plate holder:
   (a) a frame for holding a license plate,
   (b) a fastening means attachable to one side of the frame, the fastening means including an expansible spring adapted to engage behind a holder-supporting means to connect the holder to the holder-supporting means,
   (c) the spring having a cam shoulder adapted to engage the holder-supporting means, and
   (d) means engageable selectively to pry the holder away from the holder-supporting means while the cam shoulder engages the holder-supporting means and retracts the spring for disconnection from behind the holder-supporting means.

10. In a license plate holder:
    (a) a frame for holding a license plate,
    (b) a fastening means attachable to one side of the frame, the fastening means including an expansible spring adapted to engage behind a holder-supporting means to connect the holder to the holder-supporting means,
    (c) the spring having a cam shoulder adapted to engage the holder-supporting means,
    (d) the fastening means including a flange extending inwardly behind the frame to overlap the license plate,
    (e) a resilient pad secured to the flange and engageable with the license plate to hold the plate in the frame, and
    (f) a tab on the fastening means extending outwardly from the frame, the tab being engageable selectively to pry the holder away from the holder-supporting means while the cam shoulder engages the holder-supporting means and retracts the spring for disconnection from behind the holder-supporting means.

11. A license plate holder assembly, comprising:
    (a) a holder-supporting plate provided with a pair of spaced holes,
    (b) a frame for holding a license plate,
    (c) a hook connected to one side of the frame and detachably received in one of the holes to lock behind the holder-supporting plate, and
    (d) a fastening means including a snap element carried by another side of the frame and detachably snapped into the other hole to secure the frame to the holder-supporting plate.

12. A license plate holder assembly, comprising:
    (a) a holder-supporting plate provided with a pair of spaced holes,
    (b) a frame for holding a license plate,
    (c) a hook connected to one side of the frame and detachably received in one of the holes to lock behind the holder-supporting plate,
    (d) a snap element detachably secured in the other hole, and
    (e) means fastening the frame to the snap element to secure the frame to the holder-supporting plate.

13. A license plate holder assembly, comprising:
    (a) a holder-supporting plate provided with a pair of spaced holes,
    (b) a frame for holding a license plate,
    (c) a hook connected to one side of the frame and detachably received in one of the holes to lock behind the holder-supporting plate,
    (d) a snap element including expansible portions interfitting the other hole and engaging behind the holder-supporting plate for attachment, and
    (e) a screw fastening another side of the frame to the snap element, the screw precluding retraction of the expansible portions when attached and securing the frame to the holder-supporting plate.

14. A license plate holder assembly, comprising:
(a) a holder-supporting plate provided with a pair of spaced holes,
(b) a frame for holding a license plate,
(c) a hook connected to one side of the frame and detachably received in one of the holes to lock behind the holder-supporting plate,
(d) the hook having a flange extending inwardly behind the frame, and
(e) a resilient pad attached to the flange and engageable between the license plate and the holder-supporting plate to hold the license plate in the frame,
(f) a fastening means including a snap element attached to another side of the frame and detachably snapped into the other hole to secure the frame to the holder-supporting plate,
(g) the fastening means including a flange extending inwardly behind the frame, and
(h) a resilient pad attached to the fastening means flange and engageable between the license plate and holder-supporting plate to hold the license plate in the frame.

15. A license plate holder assembly, comprising:
(a) a holder-supporting plate provided with a pair of spaced holes,
(b) a frame for holding a license plate,
(c) a hook connected to one side of the frame and detachably received in one of the holes to lock behind the holder-supporting plate,
(d) a fastening means detachably secured to the other side of the frame, the fastening means including an expansible spring interfitting the other hole and engaging behind the holder-supporting plate when the hook is attached and the frame is swung about the hook connection toward the holder-supporting plate, and
(e) the spring having a cam shoulder engageable with the holder-supporting plate to retract the spring from behind the holder-supporting plate for withdrawal from the associated hole as the frame is forcefully pried away from the holder-supporting plate.

16. A license plate holder assembly, comprising:
(a) a holder-supporting plate provided with a pair of spaced holes,
(b) a frame for holding a license plate,
(c) a hook connected to one side of the frame and detachably received in one of the holes to lock behind the holder-supporting plate,
(d) the hook having a flange extending inwardly behind the frame, and
(e) a resilient pad attached to the flange and engageable between the license plate and the holder-supporting plate to hold the license plate in the frame,
(f) a fastening means detachably secured to the other side of the frame, the fastening means including an expansible spring interfitting the other hole and engaging behind the holder-supporting plate when the hook is attached and the frame is swung about the hook connection toward the holder-supporting plate,
(g) the spring having a cam shoulder engageable with the holder-supporting plate to retract the spring from behind the holder-supporting plate for withdrawal from the associated hole, and
(h) a tab on the fastening means extending outwardly from the frame, the tab being engageable to pry the frame forcefully away from the holder-supporting plate for withdrawal of the spring from the associated hole.

References Cited
UNITED STATES PATENTS

| | | | |
|---|---|---|---|
| 2,353,328 | 7/1944 | Winston | 40—10 |
| 2,853,818 | 9/1958 | Simon | 40—209 |
| 3,187,452 | 6/1965 | Dotson | 40—209 |
| 3,262,174 | 7/1966 | Duna | 40—200 X |

EUGENE R. CAPOZIO, *Primary Examiner.*
W. J. CONTRERAS, *Assistant Examiner.*